| United States Patent Office | 3,093,674 |
|---|---|
| | Patented June 11, 1963 |

3,093,674
METHOD OF PREPARING DIALKOXYORGANO-BORANES, DIARYLOXYORGANOBORANES AND DIHYDROXYORGANOBORANES
William H. Schechter, Bradfordwoods, Pa., assignor to Callery Chemical Company, Pittsburgh, Pa., a corporation of Pennsylvania
No Drawing. Filed Jan. 13, 1959, Ser. No. 786,446
17 Claims. (Cl. 260—462)

This invention relates to organoboranes and more particularly to a novel method for the preparation of organoboranes from a dialkoxyborane or a diaryloxyborane and an unsaturated organic compound.

Organoboranes, i.e., compounds in which a carbon atom is attached directly to a boron atom, have been found to be useful in several applications, e.g., as fuel additives for internal combustion engines, as plasticizers, etc. However, these compounds have not been very extensively utilized because of the lack of an inexpensive, widely-applicable method for their preparation. Heretofore, several dialkoxyalkylboranes have been prepared by the controlled air oxidation of trialkylboranes. This method required careful control to avoid dangerous explosions, results in an impure product, and is limited to the relatively few known trialkylboranes. Another method which has been used to prepare a number of alkyl and aryl dihydroxyboranes is the reaction of metal alkyls or aryls with trialkyl borates followed by hydrolysis of the product. The metal alkyls needed are expensive, and in many cases unknown, yields are low and not reproducible, and low temperatures are required to control the reaction. For example, the reaction of phenyl magnesium bromide with tri-n-butyl borate was investigated by Bean and Johnson and reported in J. Am. Chem. Soc. 54, 4415 (1932); they found the best yields (50–60%) were obtained by operating at −60° C. Other methods have been used to prepare specific organoboranes, e.g., hydrolysis of dimethyldiborane to yield dihydroxymethylborane, but in general such methods are not only specific in application but subject to the disadvantages mentioned for the above prior methods.

It is an object of this invention to provide a novel method for preparing organoboranes.

Another object is to provide a method of preparing a wide variety of dialkoxyorganoboranes, diaryloxyorganoboranes and dihydroxyorganoboranes from relatively inexpensive reactants.

A still further object is to provide a method of preparing organoboranes which is simple and economical.

Other objects will become apparent from the following specification and claims.

This invention is based upon the discovery that a dialkoxyborane, e.g., dimethoxyborane, $HB(OCH_3)_2$, or a diaryloxyborane, e.g., diphenoxyborane, $HB(OC_6H_5)_2$, will add to an unsaturated carbon to carbon linkage in an organic compound to produce a dialkoxyorganoborane and a diaryloxyorganoborane respectively.

It has been found that such reactions take place with any compound containing a carbon to carbon double or triple bond. It is noted that the benzene ring structure does not contain a double bond and does not react according to this invention. Among the types of compounds which may be used are alkenes, including arylalkenes and substituted alkenes, alkynes, and compounds containing an unsaturated carbon to carbon linkage in addition to another functional group.

In most cases the reaction takes place easily at room temperature, i.e., about 25° C. Elevated temperatures may also be used, and in some instances are desirable in order to induce a faster rate of reaction. The temperature which may be used, of course, is limited by the thermal stability of the particular reactants and products involved. Similarly, although elevated pressures may be used, atmospheric pressure is usually most satisfactory, except where both reactants are gaseous and a solvent is not used.

The reaction with the unsaturated organic compound takes place upon direct contact; however, a borate ester, hexane, mineral oil, a polyethyleneglycol dialkylether, or any other inert solvent may be used as a reaction medium if so desired. Borate esters are especially convenient solvents for use in many instances, since dialkoxyboranes and diaryloxyboranes are often obtained as a solution in borate esters.

The product obtained from the above described reaction of a dialkoxyborane or a diaryloxyborane with an unsaturated organic compound is an organoborane which may be represented by the formula $XB(OR)_2$, where X is an organic radical derived by addition of hydrogen to the unsaturated compound and OR is the alkoxy or aryloxy group from the dialkoxyborane or diaryloxyborane used. In certain cases, i.e., upon complete saturation of a triple-bonded linkage with a dialkoxyborane or diaryloxyborane, the product contains two dimethoxyboryl or diaryloxyboryl groups; such a product is also a dialkoxyorganoborane or diaryloxyorganoborane within the scope of those terms as defined herein. Such a product may be subsequently treated with water to produce the corresponding dihydroxyorganoborane, which will contain two dihydroxyboryl groups.

The following examples will serve to illustrate the method of this invention, but are not to be construed as imposing limitations thereon.

*Example 1.*—Twenty milliliters of freshly distilled dimethoxyborane were placed in an evacuated 1 liter autoclave and pressurized to 600 p.s.i.g. with ethylene. Upon heating to 150° C., the pressure rose to about 1200 p.s.i.g. After two hours the reaction mixture was distilled and the fraction boiling at 75–77° C. analyzed. It was found to contain 43% carbon, 9.4% boron and 9.9% hydrogen, compared to theoretical values of 47% carbon, 10.6% boron and 10.6% hydrogen in ethyldimethoxyborane, $C_2H_5B(OCH_3)_2$. The identification of the product was confirmed by comparison with ethyldimethoxyborane prepared from ethyl magnesium bromide and methyl borate.

*Example 2.*—Cyclohexene (10.1 millimoles) and dimethoxyborane (10.8 millimoles) were placed in a glass reaction tube and allowed to stand at 25° C. for 24 hours. The tube was then opened and an excess of water condensed into the reaction mixture. A white solid form which was extracted with ether, the ether was partially evaporated, more water was added and the remainder of the ether evaporated. The white crystalline solid which was obtained was recrystallized from carbon tetrachloride. This product, identified as cyclohexyldihydroxyborane, $C_6H_{11}B(OH)_2$ (M.P. 140° C., boron calculated 8.4%, found 7.8%) was obtained in 42% yield.

This reaction, carried out in the same manner except that a 2 fold excess of dimethoxyborane was used, gave a 93% yield of cyclohexyldihydroxyborane (boron calculated 8.4%, found 8.3%).

*Example 3.*—Inhibitor-free styrene (6.0 grams) was added to dimethoxyborane (4.0 grams) in methyl borate solution. A yield of 7.2 grams or 84% of dihydroxystyrylborane, $C_6H_5C_2H_4B(OH)_2$, was obtained after hydrolysis.

*Example 4.*—Propylene trimer (0.57 mole), a commercially available 9 carbon olefin, was added to dimethoxyborane (0.62 mole) in methyl borate solution. An 82.5% yield of dimethoxynonylborane, $C_9H_{19}B(OCH_3)_2$ (boron calculated 5.4%, found 5.5%) was obtained.

Dimethoxynonylborane (0.43 mole), prepared as described above, was treated with excess water for 18.5 hours at 80–100° C., and the water insoluble layer separated. Dihydroxynonylborane, $C_9H_{19}B(OH)_2$, was obtained in 69% yield.

*Example 5.*—A solution of 1-octadecene (59.4 millimoles) in methyl borate (144.8 millimoles) was added dropwise to a 10% solution of dimethoxyborane in methyl borate. After the addition was complete the mixture was stirred for 12 hours at 25° C. Methyl alcohol was added to destroy the excess dimethoxyborane and methyl borate was distilled off as the methyl alcohol azeotrope. Water was added to the pot residue, and the waxy solid which separated was isolated by filtration, washed with carbon tetrachloride and recrystallized from carbon disulfide. A 68% yield of 1-octadecyldihydroxyborane $C_{18}H_{37}B(OH)_2$ (M.P. 85–86° C.; boron calculated 3.7%, found 3.4%; carbon calculated 72.5%, found 72.3%; hydrogen calculated 13.1%, found 13.2%), was recovered.

*Example 6.*—Propylene tetramer (0.57 mole), a 12 carbon olefin, reacted with dimethoxyborane (1.63 moles) at room temperature in methyl borate solution. Dodecyldimethoxyborane, $C_{12}H_{25}B(OCH_3)_2$ (boron calculated 4.5%, found 4.95%) was isolated in 86% yield. Hydrolysis with excess water gave dodecyldihydroxyborane.

*Example 7.*—Octene-1 (0.50 mol) was added dropwise to 800 ml. of a solution of 0.77 mole of dimethoxyborane in methyl borate. The addition time was 35 minutes and the temperature was held at 20.5° C. with a cooling bath. After several hours 10.4 grams of methanol was added and the mixture was distilled at reduced pressure. From the two fractions boiling at 68–70° C. at 2 millimeters pressure and 61–62° C. at 1 millimeter pressure, 37.6 grams of octyldimethoxyborane, $C_8H_{17}B(OCH_3)_2$, were recovered (boron calculated 6.1%, found 5.9%).

The octyldimethoxyborane was hydrolyzed and the resultant white solid was recrystallized several times from toluene. 14.6 grams of octyldihydroxyborane were obtained (M.P. 67–70° C.; boron calculated 6.9%, found 7.05%).

*Example 8.*—ADM A–12, a commercial grade of dodecene-1 (90% pure) was added to an excess of dimethoxyborane at 25° C. After the reaction appeared complete methanol was added and the reaction mixture was distilled. 102.6 grams of dodecyldimethoxyborane were obtained. This product was hydrolyzed and the crude acid obtained in quantitative yield. Recrystallization from benzene yielded 41.1 grams of pure dodecyldihydroxyborane (M.P. 85–91° C.; boron calculated 5.05%, found 5.09%).

Other similar tests were conducted with such unsaturated compounds as 2,4,4-trimethylpentene-1, butene-1, ADM A–51 (a mixture of olefins containing from 12 to 20 carbon atoms per molecule), 2-methylbutadiene-1,3 (isoprene), cyclopentadiene, and camphene. While in certain cases, such as, for example, the reaction of camphene with dimethoxyborane, the yields of dialkoxyorganoborane obtained are relatively low because of undesired side reactions which occurred at the conditions used, the desired product was produced in appreciable quantities in all instances.

The presence in the unsaturated molecule of other functional groups does not prevent its reaction with the dialkoxyborane or diaryloxyborane at the point of unsaturation. In some cases the other functional group will also react, especially, if higher temperatures are used. In other cases, the unsaturated linkage alone reacts. The following are several examples of such reactions.

*Example 9.*—Allyl chloride (134 millimoles) reacted at room temperature with dimethoxyborane (149 millimoles) in methyl borate solution. A crude yield of 8.6 grams or 52% of chloropropyldihydroxyborane, $ClC_3H_6B(OH)_2$ was obtained upon hydrolysis of the chloropropyldimethoxyborane produced. After purification the chloropropyldihydroxyborane (boron calculated 8.8%, found 8.4%) melted at 81–83° C.

*Example 10.*—Allyl ethyl ether (0.74 mole) was placed in a glass reaction flask and dimethoxyborane (0.82 mole) in methyl borate solution was added at room temperature. After the reaction was complete the methyl borate was removed and a 66.5% yield of (ethoxypropyl)dimethoxyborane, $C_2H_5OC_3H_6B(OCH_3)_2$, (boron calculated 6.75%, found 6.6%) was recovered. Hydrolysis of (ethoxypropyl)dimethoxyborane with an excess of water gave (ethoxypropyl)dihydroxyborane, $C_2H_5OC_3H_6B(OH_3)_2$, in about 62% yield.

*Example 11.*—Allylamine (0.415 mole) reacted while at room temperature with dimethoxyborane (0.480 mole) in methyl borate to produce 14.7 grams of a product containing a 1 to 1 ratio of boron and nitrogen. This product has not been fully characterized but is believed to be (aminepropyl) dimethoxyborane, $NH_2(CH_2)_3B(OCH_3)_2$. It is insoluble in benzene and hexane, soluble in acetone and methyl ethyl ketone, and melts with decomposition at about 325° C.

*Example 12.*—Cinnamaldehyde (0.375 mol) was added slowly to dimethoxyborane (0.94 mol) in methyl borate solution. Almost all the dimethoxyborane was consumed in the reaction, indicating that reduction of the aldehyde group and addition to the double bond took place simultaneously according to the equation

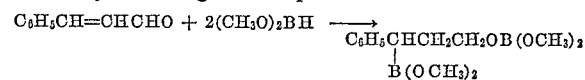

Distillation of the crude reaction product yielded a fraction boiling at 165–176° C. at 1–2 mm. Hg pressure; the analysis of this fraction corresponded to the calculated values for the above product.

*Example 13.*—Trans 1,2-dichloroethylene (58.2 grams) was mixed with dimethoxyborane (66.5 grams) in methyl borate solution at 25° C. The crude reaction product was distilled at reduced pressure, and 1,2-dichloroethyldimethoxyborane (54.4 grams, boron calculated 6.85%, found 7.6%) was obtained as the fraction boiling at 33.5–35° C. at 4 mm. Hg pressure.

The hydrolysis of this product with water was very exothermic and was accompanied by vigorous effervescence. The product obtained from the hydrolysis was contaminated with boric acid.

*Example 14.*—The reaction of methyl acrylate and dimethoxyborane was carried out in the manner described above. The crude product was a viscous liquid which on distillation formed a brown tar, and only about a 2% yield of the expected product,

was obtained.

*Example 15.*—Allyl phenyl ether and dimethoxyborane were reacted and after hydrolysis of the reaction mixture produced 34.5 grams of crude moist product. Recrystallizations from ethylene dichloride yielded 14.6 grams of phenoxypropyldihydroxyborane (M.P. 92–96° C.; boron calculated 5.95%, found 5.6%).

The reaction of dialkoxyboranes and diaryloxyboranes with unsaturated organic compounds has been found to take place with compounds containing carbon to carbon triple bonds as well as with those containing double bonds. The data obtained from such reactions indicate that it takes place in two steps. In the first step, one mole of dialkoxyborane reacts with each triple bond, with an additional mole of dialkoxyborane reacting in the second step. The second step appears to be slower than the first and thus the nature of the product, i.e., whether containing one or two dimethoxyboryl groups, can be controlled, at least to some extent, by the ratio of the reactants used. The reaction of diaryloxyboranes with triple-bonded compounds takes place similarly. This embodiment of the invention is illustrated by the following examples.

*Example 16.*—1-hexyne (13.6 millimoles) and dimethoxyborane (30.6 millimoles) were allowed to react at room temperature in a sealed reaction tube. Upon opening the tube, 2.6 millimoles of unreacted dimethoxyborane were recovered. The product, weighing 2.35 grams, was found to be bis(dimethoxyboryl)hexane, $C_6H_{12}[B(OCH_3)_2]_2$, indicating that two moles of dimethoxyborane had reacted with one mole of 1-hexyne to fully saturate the triple bond. This product was recovered in 94% yield and contained 9.4% boron compared to the calculated value of 9.7%.

This reaction carried out in a similar manner but using a 1 to 1 mole ratio of dimethoxyborane to 1-hexyne, gave a product which consisted primarily of the mono-(dimethoxyboryl) derivative.

*Example 17.*—A glass reaction tube was charged with 5-decyne (9.4 millimoles) and dimethoxyborane (20.0 millimoles), of sealed and allowed to stand at room temperature for several days. The tube was then opened and the contents analyzed. 1.0 millimole of unreacted dimethoxyborane was recovered, along with 2.1 grams of bis(dimethoxyboryl)decane, $C_{10}H_{20}[B(OCH_3)_2]_2$, (boron calculated 7.6%, found 7.5%), a 79.4% yield. Upon hydrolysis of this product an 88% yield of bis-(dihydroxyboryl)decane (boron calculated 9.4%, found 9.0%) was obtained.

As the above examples indicate, the method of preparing dialkoxyorganoboranes described herein is applicable generally to any compound containing at least one unsaturated carbon to carbon linkage. This versatility has been further demonstrated by other tests, which included reactions with diolefins, for example, 2,5-dimethyl-1, 5-hexadiene; "internal" olefins, i.e., olefins in which the terminal carbons are saturated, for example, 2-octene; and unsaturated esters, for example, allyl borate. In all of these cases the reactions went easily at room temperature or below, with yields of up to 85% being obtained.

Although dimethoxyborane is preferred in carrying out the method of this invention, since it is the most readily available dialkoxyborane, other dialkoxyboranes and diaryloxyboranes may also be used. The tests described below exemplify the use of such compounds as reactants.

*Example 18.*—Di-n-octoxyborane, $HB(OC_8H_{17})_2$, was prepared as a solution in tri-n-octoxyborane by reaction of tri-n-octoxyborane with diborane and removal of the unreacted diborane. It was identified by infrared analysis.

Hexene-1 was added to the solution of di-n-octoxyborane and the mixture heated to 78° C. for several hours. After the reaction appeared complete, the crude hexyldioctoxyborane was treated with water for two hours. This mixture was extracted with ether and the white crystalline solid which was obtained upon evaporation of the ether was identified as hexyldihydroxyborane. Confirmation of the identification was had by comparison of its X-ray diffraction pattern with that of a sample of hexyldihydroxyborane prepared from dimethoxyborane and hexene-1.

*Example 19.*—Diphenoxyborane, $HB(OC_6H_5)_2$, was prepared from triphenoxyborane and diborane and reacted with hexene-1 in the manner described above. The product obtained after hydrolysis of the crude hexyldiphenoxyborane produced was a white crystalline solid corresponding to that obtained in Example 18 and identified as hexyldihydroxyborane.

Other similar reactions were carried out using other dialkoxyboranes and diaryloxyboranes, such as, for example, diisopropoxyborane, $HB(OC_3H_7)_2$, and dioctodecoxyborane, $HB(OC_{18}H_{37})_2$.

The dialkoxyorganoboranes and diaryloxyorganoboranes in general are useful as additives for gasoline fuels in internal combustion engines. When added to gasoline, these compounds prevent the large increase in octane requirement which such engines ordinarily show on prolonged operation. Although their action in this respect is not fully understood, it is believed that they act to retard oxidation of the fuel components and to inhibit gum forming in the engine. As little as 0.001% of dialkoxyorganoborane or diaryloxyorganoborane by weight appears to have an appreciable effect.

The dihydroxyorganoboranes may also be used as fuel additives, as well as for other purposes. The hydrolysis of dialkoxyorganoboranes and diaryloxyorganoboranes to produce the dihydroxy compounds ordinarily takes place upon simply admixing with water. Heating is sometimes employed in order to increase the rate of reaction in those examples which react slowly at room temperature, especially in the case of the more complex organo derivatives. Temperatures of 80 to 100° C. have usually been found to be sufficient in all cases. It has been found in some cases that a purer product is obtained and the hydrolysis is more easily carried out if the water used is deoxygenated prior to use in the hydrolysis step. This may be easily accomplished by boiling the water and protecting it from subsequent contact with the air, although other deoxygenation methods may be used if desired.

This application is a continuation-in-part of my application, Ser. No. 681,457, filed September 3, 1957, now abandoned.

According to the provisions of the patent statutes, I have explained the principle of my invention and have described what I now consider to be its best embodiments. However, I desire to have it understood that, within the scope of the appended claims, the invention may be practiced otherwise than as specifically described.

I claim:

1. A method of preparing an organoborane selected from the group consisting of dialkoxyorganoboranes and diaryloxyorganoboranes comprising reacting a compound containing at least one unsaturated carbon to carbon linkage with a member selected from the group consisting of dialkoxyboranes and diaryloxyboranes and recovering the organoboranes thus produced.

2. A method of preparing a dialkoxyorganoborane comprising reacting a compound containing at least one unsaturated carbon to carbon linkage with a dialkoxyborane and recovering the dialkoxyorganoboranes thus produced.

3. A method according to claim 2 in which the dialkoxyborane is dimethoxyborane, $HB(OCH_3)_2$, and the dialkoxyorganoborane is a dimethoxyorganoborane.

4. A method according to claim 1 in which the reactants are reacted in the presence of an inert solvent.

5. A method according to claim 2 in which the dialkoxyborane is dimethoxyborane, $HB(OCH_3)_2$, the dialkoxyorganoborane is a dimethoxyorganoborane, and which is carried out in methyl borate as a solvent.

6. A method of preparing an organoborane selected from the group consisting of dialkoxyorganoboranes and diaryloxyorganoboranes comprising reacting an alkene with a member selected from the group consisting of dialkoxyboranes and diaryloxyboranes and recovering the organoboranes thus produced.

7. A method according to claim 6 in which the alkene contains 12 carbon atoms, said member is dimethoxyborane, and the organoborane is dimethoxydodecylborane.

8. A method according to claim 6 in which the alkene contains 9 carbon atoms, said member is dimethoxyborane and the organoborane is dimethoxynonylborane 9. A method of preparing an organoborane selected from the group consisting of dialkoxyorganoboranes and diaryloxyorganoboranes comprising contacting an alkyne with a member selected from the group consisting of dialkoxyboranes and diaryloxyboranes and recovering the organoborane thus produced.

10. A method according to claim 9 in which the mole ratio of said member to alkyne is about one to one.

11. A method according to claim 9 in which the mole ratio of said member to alkyne is at least about two to one.

12. A method of preparing an organoborane selected from the group consisting of dialkoxyorganoboranes and diaryloxyorganoboranes comprising reacting an ether having an unsaturated carbon to carbon linkage with a member selected from the group consisting of dialkoxyboranes and diaryloxyboranes and recovering the organoborane thus produced.

13. A method of preparing (ethoxypropyl)dimethoxyborane comprising reacting allyl ethyl ether with dimethoxyborane and recovering the (ethoxypropyl)dimethoxyborane produced.

14. A method of preparing a dihydroxyorganoborane comprising reacting a compound containing at least one unsaturated carbon to carbon linkage with a member selected from the group consisting of dialkoxyboranes and diaryloxyboranes, contacting the reaction mixture thus formed with water and separating and recovering the dihydroxyorganoborane produced.

15. A method according to claim 14 in which said member is dimethoxyborane, $HB(OCH_3)_2$.

16. A method of producing a dihydroxyorganoborane comprising reacting an alkene with a member selected from the group consisting of dialkoxyborane and diaryloxyborane, reacting the reaction mixture thus formed with water and separating and recovering the dihydroxyorganoborane produced.

17. A method of preparing a dihydroxyorganoborane comprising reacting an alkyne with a member selected from the group consisting of dialkoxyboranes and diaryloxyboranes, reacting the reaction mixture thus formed with water and separating the dihydroxyorganoborane produced.

References Cited in the file of this patent

Hennion et al.: J. Am. Chem. Soc., vol. 80, pp. 617–9. (1958).

Hurd: J. Am. Chem. Soc. 70, 2053 (1948).

Stone et al.: Chem. Soc. Journ. (London), page 2755, (1950).